United States Patent
Scaletta et al.

(10) Patent No.: US 8,331,928 B2
(45) Date of Patent: Dec. 11, 2012

(54) METHOD AND APPARATUS TO FACILITATE USING MULTIPLE CARRIER FREQUENCIES

(75) Inventors: John Steven Scaletta, Algonquin, IL (US); Edward J. Lukas, Batavia, IL (US); Robert R. Keller, Jr., Park Ridge, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 833 days.

(21) Appl. No.: 12/246,924

(22) Filed: Oct. 7, 2008

(65) Prior Publication Data
US 2010/0087156 A1    Apr. 8, 2010

(51) Int. Cl.
*H04Q 7/00* (2006.01)
(52) U.S. Cl. ............. 455/434; 455/104; 455/161.1; 455/550.1
(58) Field of Classification Search ............ 455/91, 455/103–105, 161.1, 434, 446, 447, 550.1
See application file for complete search history.

(56) References Cited

U.S. PATENT DOCUMENTS

| | | | |
|---|---|---|---|
| 723,188 | A | 3/1903 | Tesla |
| 725,605 | A | 4/1903 | Tesla |
| 2,292,387 | A | 8/1942 | Markey et al. |
| 5,710,992 | A * | 1/1998 | Sawada et al. ............ 455/161.2 |
| 6,915,146 | B1 | 7/2005 | Nguyen et al. |
| 2006/0109078 | A1 | 5/2006 | Keller, Jr. et al. |
| 2006/0109079 | A1 | 5/2006 | Mack |
| 2007/0126552 | A1 | 6/2007 | Fitzgibbon |
| 2008/0137715 | A1 | 6/2008 | Fitzgibbon |
| 2008/0224885 | A1 | 9/2008 | Rodriguez et al. |

* cited by examiner

*Primary Examiner* — Nhan Le
(74) *Attorney, Agent, or Firm* — Fitch Even Tabin & Flannery LLP

(57) ABSTRACT

A wireless radio frequency transmitter (400), upon detecting (101) an end user assertion of an end user interface and in automatic response thereto, uses a first rolling carrier frequency to transmit (102) a message. Upon then determining (104) that the end user is continuing to assert this end user interface, this transmitter then re-transmits (105) that message using a predetermined fixed carrier frequency. By one approach, the first rolling carrier frequency is selected from amongst a pool of candidate carrier frequencies using a carrier frequency calculation formula. By another approach, this carrier frequency is selected from one or more tables that comprise a plurality of different carrier frequencies.

7 Claims, 3 Drawing Sheets

METHOD AND APPARATUS TO FACILITATE USING MULTIPLE CARRIER FREQUENCIES

TECHNICAL FIELD

This invention relates generally to wireless radio frequency transmissions and more particularly to application settings characterized by multiple candidate wireless radio frequency carriers.

BACKGROUND

The use of wireless radio frequency carriers to convey information comprises a well understood area of endeavor. By one approach, remote control messages (such as, but not limited to, movable barrier movement control messages) are conveyed from an end user remote control transmitter to a corresponding platform to be controlled. In many such application settings there are a plurality of candidate wireless radio frequency carriers that can be potentially employed to convey such messages. Employed properly, such circumstances can be leveraged to aid in avoiding local interference that might otherwise prevent part or all of such a message from reaching the intended destination target.

At the same time, however, there exists a strong desire to maintain at least some degree of useful backward compatibility with earlier approaches that may not rely upon such agility and flexibility with respect to multi-carrier capabilities. This desire typically presents designers with an unfortunate choice; eschew the interference-avoiding benefits of flexibly using multiple carrier frequencies or surrender the benefits of supporting backwards compatibility. This, in turn, leads to unduly compromised platforms that fail to yield a level of reliable performance that the end user population rightly expects and anticipates.

BRIEF DESCRIPTION OF THE DRAWINGS

The above needs are at least partially met through provision of the method and apparatus to facilitate using multiple carrier frequencies described in the following detailed description, particularly when studied in conjunction with the drawings, wherein.

Figure 1:
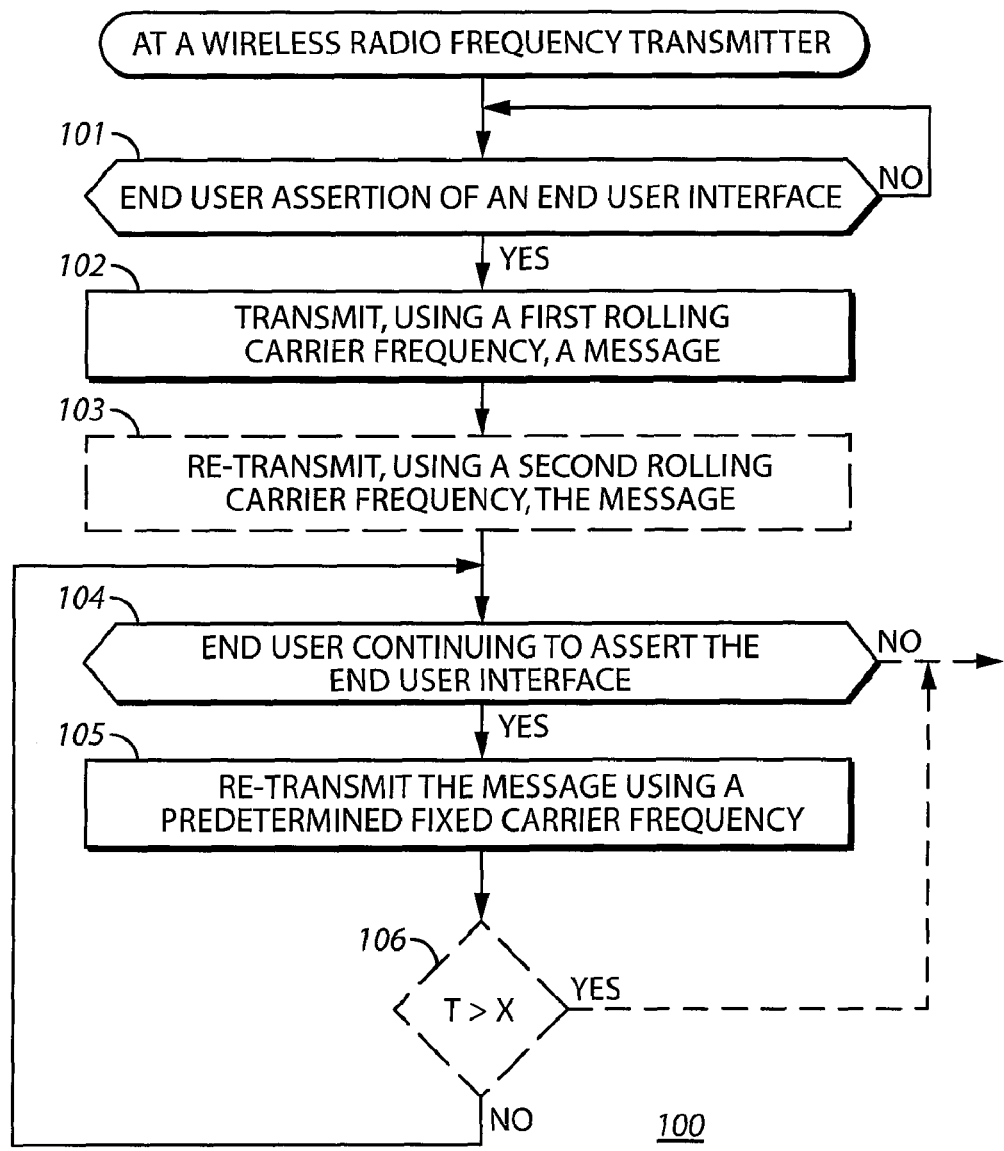
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a wireless radio frequency transmitter, upon detecting an end user assertion of an end user interface and in automatic response thereto, uses a first rolling carrier frequency to transmit a message. Upon then determining that the end user is continuing to assert this end user interface, this transmitter then re-transmits that message using a predetermined fixed carrier frequency.

By one approach, the first rolling carrier frequency is selected from amongst a pool of candidate carrier frequencies using a carrier frequency calculation formula. By another approach, this carrier frequency is selected from a table that comprises a plurality of different carrier frequencies.

The aforementioned fixed carrier frequency can comprise, for example, a carrier frequency that is widely used amongst a legacy population of installed receivers. For example, and by way of illustration, this fixed carrier frequency can comprise 315 MHz when the application setting comprises the transmission of garage door opener remote control instructions within the United States.

These teachings will also readily accommodate, if desired, also re-transmitting the message using a second rolling carrier frequency. In a typical application setting, this second rolling carrier frequency will be different than the first rolling carrier frequency. So configured, for example, this transmitter may first transmit the message using the first rolling carrier frequency and then transmit the message using the second rolling carrier frequency. And then, if and as the end user continues to assert the end user interface, this transmitter can then continue to re-transmit this message using the predetermined fixed carrier frequency as described above.

Those skilled in the art will recognize and appreciate that these teachings represent a highly flexible and readily leveraged approach to employing and benefiting (as possible in a given application setting) from the use of multiple carrier frequencies while also tending to ensure a high degree of backwards compatibility with a sizeable legacy base of installed platforms. It will further be acknowledged that these teachings can be implemented in a highly cost effective manner and that an end user can benefit from these teachings with little or no supplemental or specific training in these regards.

These and other benefits may become clearer upon making a thorough review and study of the following detailed description. Referring now to the drawings, and in particular to FIG. 1, an illustrative process that is compatible with many of these teachings will now be presented. This illustrative example can be carried out, for example, by a wireless radio frequency transmitter. This might comprise, for example, a remote control transmitter such as a remote entry control transmitter (such as a remote control transmitter for use with a corresponding movable barrier operator) as is known in the art.

This process 100 provides for the step 101 of detecting assertion of an end user interface. This can comprise, for example, an end user interface as comprises a part of the aforementioned wireless radio frequency transmitter. These teachings will readily accommodate a wide variety of end user interfaces in this regard. Examples include, but are not limited to, a push button, a keypad key, or even a proximity sensor that can detect an end user's proximity thereto. Those skilled in the art will recognize that other possibilities exist in this regard as well with yet others likely to be developed going forward.

As an automatic response to the detection of an end user assertion of this end user interface, this process 100 then provides the step 102 of transmitting a message using a first rolling carrier frequency. The payload of this message can of course vary with the application setting. When the wireless radio frequency transmitter comprises a remote movable barrier operator, for example, this message can comprise, at least in part, an instruction to a corresponding movable barrier operator to begin moving a movable barrier to an opened or a closed position.

As used herein, the expression "rolling carrier frequency" will be understood to refer to a carrier frequency that comprises one from amongst a plurality of candidate available carrier frequencies (where the expression "candidate" will be understood to refer to selections that are genuinely and substantively presently available for selectable use) where the particular carrier frequency that comprises the "rolling" carrier frequency at a given moment is automatically selected pursuant to a particular selection scheme. So configured, the particular carrier frequency used to transmit this message under these circumstances will change from time to time in synchronicity with some corresponding trigger event (such as with each assertion of the end user interface).

By one approach, this rolling carrier frequency can be selected using a formula that calculates a plurality of different carrier frequencies. As one very simple illustrative example in this regard, and presuming that there are only two candidate carrier frequencies in the selection pool, the formula can comprise deriving a random (or at least a pseudo-random) number, and isolating the least significant digit of that number. When this least significant digit is odd, this process can provide for selecting a first one of the two candidate carrier frequencies and when this least significant digit is even, this process can provide for selecting the remaining one of the two candidate carrier frequencies. Those skilled in the art will recognize and understand that this example is intended to serve only in an illustrative capacity and is not intended to comprise an exhaustive listing of all possibilities in this regard.

By another approach, this first rolling carrier frequency can be selected from a table that comprises a plurality of different carrier frequencies. Making momentary reference now to FIG. 1, this can comprise, for example, selecting a next sequential carrier frequency (based upon a last-used carrier frequency) in a first such table. Using the illustrated Table 1 201, for example, when the last-used carrier frequency was F1, this would comprise now selecting F2 as the first rolling carrier frequency.

In such a case, and upon reaching the last carrier frequency in the table (in this case, the frequency denoted as FM in Table 1 201, where "M" comprises an integer), this process 100 will accommodate beginning again with the first frequency (i.e., F1 in Table 1) and carrying on as before. These teachings will also accommodate, however, using a plurality of such tables. This is illustrated in FIG. 1 by the inclusion of Table N 202 (where "N" comprises an integer). In such a case, these multiple tables can include identical carrier frequencies (though possibly in a different order from one another), some identical carrier frequencies and some different carrier frequencies, or only different carrier frequencies from one another as desired.

When using multiple tables, and again upon reaching a last carrier frequency in a given such table (such as, for example, frequency FM in Table 1 201), this process 100 will accommodate now rolling to the next sequential table (such as Table N 202 when there are only two such tables in a given application setting) to select a next sequential carrier frequency (such as, in this illustrative example, FA in Table N 202). Upon reaching the last carrier frequency in the last table, this process 100 would also accommodate than beginning again with the first carrier frequency of the first table.

Those skilled in the art will recognize and appreciate that other possibilities exist in these regards. For example, a first time through such a plurality of tables one might only select every other carrier frequency when rolling from one to another to use as the first rolling carrier frequency. Then, on a next subsequent time through this plurality of tables one might use only the previously skipped carrier frequencies for this purpose.

By one approach, this step 102 of transmitting the message using the first rolling carrier frequency can comprise transmitting this message, in its entirety, more than once using this first rolling carrier frequency. For example, if desired, these teachings will accommodate transmitting such a message twice using this first rolling carrier frequency. These teachings will also accommodate, if desired, transmitting only an incomplete portion of the message using the first rolling carrier frequency. The foregoing concepts can also be combined, if desired. For example, the message in its entirety might be transmitted twice followed by transmitting only a portion of the message using this first rolling carrier frequency.

Referring again to FIG. 1, this process 100 will also optionally accommodate, if desired, a step 103 of re-transmitting this same message using a second rolling carrier frequency. This second rolling carrier frequency, for example, can be different from the first rolling carrier frequency. As before, this can comprise transmitting multiple copies of the message and/or only portions of the complete message as desired. Also as before, this second rolling carrier frequency be selected using a corresponding formula (which may be the same as, or different than, a formula that was used, in whole or in part, to select the first rolling carrier frequency) or one or more tables as described above.

When employing one or more tables to select the second rolling carrier frequency, this can comprise using a part of a table, or all of a given table, that is used for the second rolling carrier frequency to the exclusion of the first rolling carrier frequency, as desired. Accordingly, by one approach, both the first and the second rolling carrier frequency can be selected from a same table if desired (for example, by simply selecting a next carrier frequency in the table for the second rolling carrier frequency as sequentially follows the carrier frequency that had been selected for the first rolling carrier frequency).

In any event, this process 100 then provides the step 104 of determining whether the end user is continuing to assert the aforementioned end user interface. In particular, this step 104 can comprise determining whether the end user is continuing to assert the end user interface beyond the aforementioned use of the first rolling code carrier frequency (or the use of the first and the second rolling code carrier frequency when employing the latter). By way of illustration and not limitation, when the end user interface comprises a push button, this step 104 can comprise detecting that the end user continues to assert the push button subsequent to the automatic transmission of the message using the first (and possibly the second) rolling carrier frequency.

When such is not the case, this process 100 will accommodate then concluding and/or continuing on with such other functionality and activities as may be useful in a given application setting. When the end user does continue to assert the end user interface, however, this process 100 can then provide the step 105 of re-transmitting the aforementioned message using a predetermined fixed carrier frequency. As used herein, the expression "fixed" will be understood to refer to a carrier frequency that does not change on a regular basis as does the aforementioned rolling carrier frequencies. Generally speaking, this fixed carrier frequency (though possibly alterable by, for example, a trained person using special equipment) is intended during normal operation to not vary and to remain the same and constant.

Generally speaking, this fixed carrier frequency can comprise a frequency that will compatibly accommodate, for example, legacy message targets. For example, when the application setting presumes that these messages are being transmitted to movable barrier operators, this fixed carrier frequency can comprise about 315 MHz. This carrier frequency is used by a relatively large number of already-installed movable barrier operators and hence is likely to be compatibly received by such existing platforms.

By one approach, this process 100 will accommodate continuing to transmit the message (repeatedly) using this fixed carrier frequency so long as the end user interface remains asserted. If desired, however, these teachings will also accommodate, for example, detecting when some predetermined condition occurs and then concluding such transmissions in response thereto. For example, as illustrated, when transmission time T ultimately exceeds some value X (such as five seconds, ten seconds, thirty seconds, or the like), this process 100 can provide for concluding itself and then carrying on with such subsequent activities as may be desired by the system designer.

Figure 2:
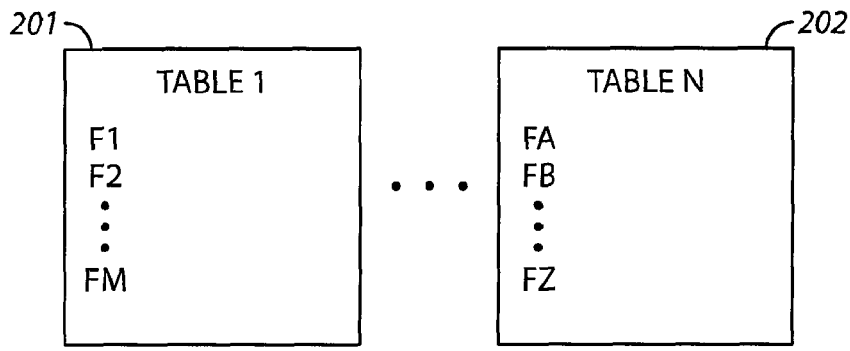
FIG. 2 comprises a schematic representation as configured in accordance with various embodiments of the invention.

Referring again to FIG. 2, the carrier frequencies included in one or more of these tables can be selectively grouped, if desired, to correspond to some grouping criteria of choice. To illustrate, by one approach, this can comprise including in, for example, Table 1 201, a group of carrier frequencies that are approximately 350 MHz (as may be pertinent, for example, to an application setting that presumes deployment within the United States). In such a case, carrier frequencies F1 through FM might comprise a number of frequencies within the 315 MHz band (such as 300 MHz, 305 MHz, 310 MHz, and 315 MHz) and the 433.92 MHz band (such as 433.57 MHz, 433.92 MHz, and 434.27 MHz). As another example in this regard, Table N 202 can include a group of carrier frequencies that are approximately 350 MHz (as may be pertinent, for example, to an application setting that presumes deployment outside the United States). In such a case, carrier frequencies FA through FZ might comprise a number of frequencies within the 433.92 MHz band (as already noted above) and the 868.30 MHz band (such as 868.30 MHz and 868.95 MHz).

Figure 3:
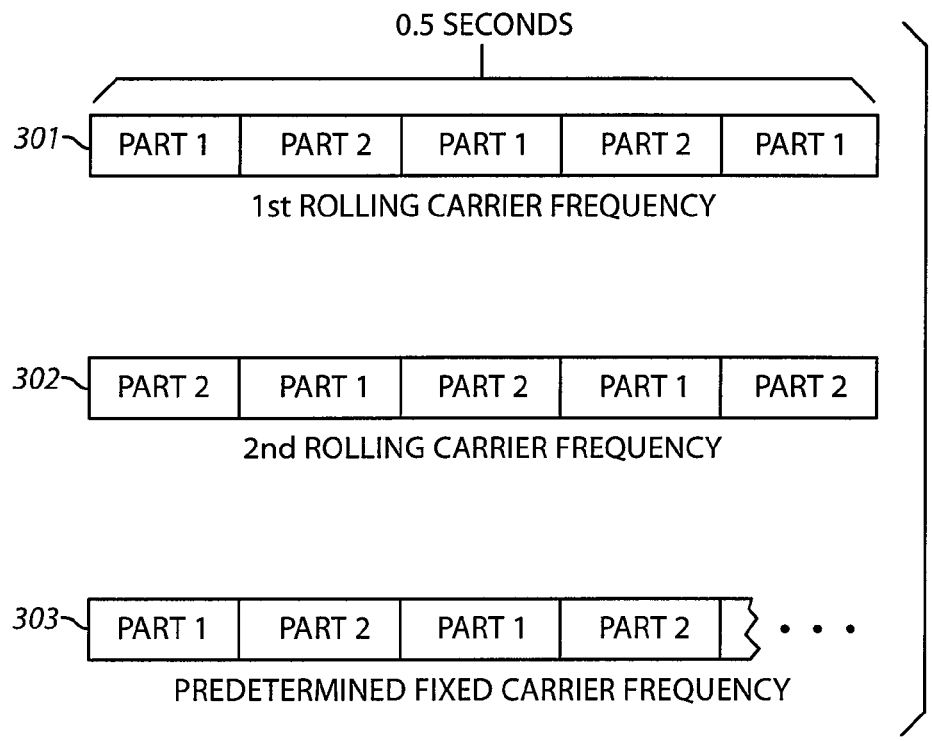
FIG. 3 comprises a schematic representation as configured in accordance with various embodiments of the invention.

Those skilled in the art will recognize and appreciate that these teachings offer a highly flexible and robust approach that can readily accommodate a wide variety of known and later-developed application settings. Referring now to FIG. 3, a single illustrative example in these regards will be provided; those skilled in the art will understand that this example comprises a non-limiting example and that there are, in fact, a vast number of other possibilities that could be presented.

In this illustrative example, when the end user asserts the aforementioned end user interface, a first transmission 301 lasting 0.5 seconds comprises the use of a first rolling carrier frequency to transmit a message. More particularly, this comprises the transmission of a Part 1 of the message (such as a first half of the substantive content of the message) followed by Part 2 of the message (such as a remaining half of the substantive content of the message). This is followed by a re-transmission of Parts 1 and 2 and a last re-transmission of Part 1. This first transmission 301 is automatically followed by a second transmission 302 (also lasting 0.5 seconds) that comprises the use of a second rolling carrier frequency to transmit, first, Part 2 of the message followed by additional re-transmissions of Parts 1 and 2 as illustrated. So configured, the complete message is transmitted a total of five times over the course of 1.0 second using two different carrier frequencies.

In this illustrative example, the end user continues to assert the end user interface beyond the time required to make the aforementioned transmissions (i.e., for longer than 1.0 second). This being so, the aforementioned transmissions are followed by a re-transmission of the parts of the message using a predetermined fixed carrier frequency (in this example, 315 MHz). This concluding transmission continues, in this example, until the end user discontinues asserting the end user interface.

Figure 4:
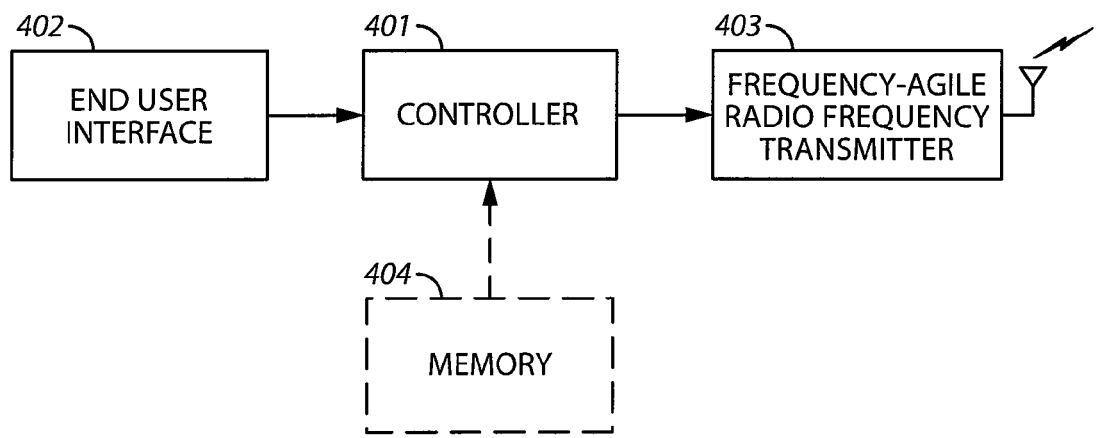
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will be provided.

This apparatus 400 can comprise, for example, a wireless radio frequency transmitter of choice. This can comprise, for example, a remote control transmitter such as a remote entry control transmitter. Examples in this regard include, but are not limited to, a movable barrier operator remote control. (Movable barrier operators of various kinds are known in the art and include, for example, so-called garage door openers. Movable barrier operators typically serve to facilitate the automated movement of one or more corresponding movable barriers (such as, but not limited to single panel and segmented garage doors, rolling shutters, pivoting and sliding gates, arm guards, and so forth). In many cases such movable barrier operators are responsive to a remotely sourced control signal (or signals) to institute such activity.)

This apparatus 400 comprises a controller 401 that operably couples to an end user interface 402 and a frequency-agile radio frequency transmitter 403. The end user interface 402 can comprise any of a wide variety of interface form factors and/or modalities as desired. Examples in this regard include, but are not limited to, push buttons, keypad keys, and end user proximity sensors (to sense, for example, proximity of an end user's hand). Other possibilities include acoustically-based sensors (including speech recognition interfaces and speaker recognition interfaces), touch screens, and so forth.

The frequency-agile radio frequency transmitter 403 can, as well, comprise any of a wide variety of technologies and approaches. By one approach, this can comprise using a plurality of set-frequency transmitters. By another approach, this can comprise using a single transmitter that is capable of selectively transmitting at a plurality of different selectable carrier frequencies. Those skilled in the art will recognize that there are various ways by which such functionality can be carried out. As these teachings are not particularly sensitive to the selection of any particular approach in these regards, further elaboration will not be provided here for the sake of brevity.

Those skilled in the art will recognize and appreciate that such the controller 401 can comprise a fixed-purpose hard-wired platform or can comprise a partially or wholly programmable platform (such as a microprocessor or a microcontroller). All of these architectural options are also well known and understood in the art and require no further description here. This controller 401 can be configured (using, for example, corresponding programming as will be well understood by those skilled in the art) to carry out one or more of the steps, actions, and/or functionality described herein. This can comprise, for example, detecting an end user assertion of the end user interface 402 and automatically responding by using the frequency-agile radio frequency transmitter 403 to transmit (using a first rolling carrier frequency) a message and then determining whether the end user continues to assert the end user interface 402. When true, the controller 401 can then re-transmit that message (again using the frequency-agile radio frequency transmitter 403) using a predetermined fixed carrier frequency.

Such programming can be stored, if desired, within a memory 404 that also operably couples to the controller 401. Such a memory 404 can also serve to store the aforementioned tables to render those tables available for use by the controller 401 as described herein.

Those skilled in the art will recognize and understand that such an apparatus 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

By one approach, one can also arrange for the deployment of receiving platforms that specifically anticipate the availability of such transmitters. This can comprise, for example, the configuring of a wireless radio frequency receiver to employ a unique learning and normal mode of operation.

Figure 5:
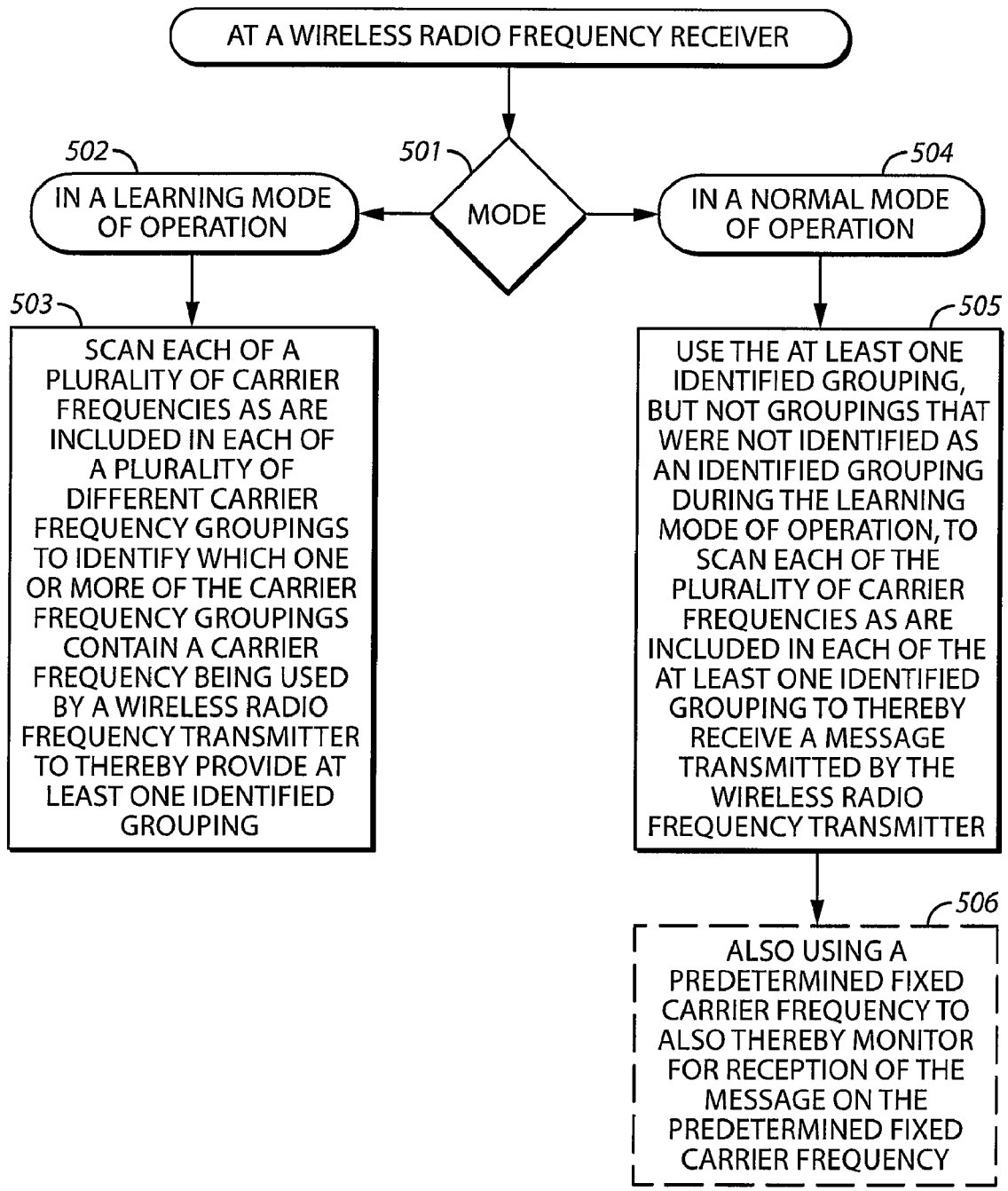
FIG. 5 comprises a flow diagram as configured in accordance with various embodiments of the invention.

By way of illustration, and referring now to FIG. 5, a wireless radio frequency receiver (such as a may comprise a part of a movable barrier operator) can select 501 between at least a learning mode of operation 501 and a normal mode of operation 504. This selection 501 can be based upon, for example, determining the state of a corresponding end user switch and/or state-selection protocol. Generally speaking, the use of a learning mode of operation in conjunction with a movable barrier operator comprises a known area of endeavor and does not require significant elaboration here.

During the learning mode of operation 502, this process 500 has the wireless radio frequency receiver effect the step 503 of scanning each of a plurality of carrier frequencies as are included in each of a plurality of different carrier frequency groupings (such as the groupings described above) to identify which one or more of the carrier frequency groupings contain a carrier frequency being presently used by a wireless radio frequency transmitter. This step will yield an identified grouping that can be leveraged by the receiver during the normal mode of operation 504.

More particularly, during the normal mode of operation 504, this process 500 can provide the step 505 of using this identified grouping to scan each of the corresponding carrier frequencies as are included in that identified grouping to thereby effect receiving a message (such as a remote control message) as transmitted by the wireless radio frequency transmitter. When the learning mode yields a plurality of such identified groupings, this normal mode of operation can of course accommodate using all of those identified groupings to provide the basis for such scanning.

Scanning, of course, comprises a well-understand prior art practice. Here, however, the carrier frequencies that are scanned are uniquely determined via the aforementioned learning mode. In particular, these teachings permit such a receiver to use (during the normal mode of operation) carrier frequencies as correspond to the identified grouping (or groupings) while not using groupings that were not identified as an identified grouping during the learning mode of operation. This, in turn, can lead to faster and more reliable acquisition of a transmitted message in such an operating context.

In an illustrative example provided above, the transmitter transmits the message using a first rolling carrier frequency followed by re-transmission of that message using a second rolling carrier frequency. In such a case, this normal mode of operation 504 can comprise receiving the message using a first carrier frequency that comprises one of the plurality of carrier frequencies as comprises a part of an identified grouping and then receiving the message using a second carrier frequency that comprises one of the plurality of carrier frequencies that is different than the first carrier frequency.

This normal mode of operation 504 can further optionally comprise, if desired, the step 506 of also using a predetermined fixed carrier frequency to also thereby monitor (at least from time to time, such as via a scanning process) for reception of the message on the predetermined fixed carrier frequency.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
at a wireless radio frequency receiver:
in a learning mode of operation:
scanning each of a plurality of carrier frequencies as are included in each of a plurality of different carrier frequency groupings to identify which one or more of the carrier frequency groupings contain a carrier frequency being used by a wireless radio frequency transmitter to thereby provide at least one identified grouping;
in a normal mode of operation:
using the at least one identified grouping, but not groupings that were not identified as an identified grouping during the learning mode of operation, to scan each of the plurality of carrier frequencies as are included in each of the at least one identified grouping to thereby receive a message transmitted by the wireless radio frequency transmitter;
receiving the message using a first carrier frequency that comprises one of the plurality of carrier frequencies;
receiving the message also using a second carrier frequency that comprises one of the plurality of carrier frequencies that is different than the first carrier frequency.

2. The method of claim 1 further comprising:
in the normal mode of operation:
also using a predetermined fixed carrier frequency to also thereby monitor for reception of the message on the predetermined fixed carrier frequency.

3. The method of claim 1 wherein using a second carrier frequency comprises using a carrier frequency that is next in a sequence as corresponds to the first carrier frequency.

4. The method of claim 3 wherein the sequence comprises a table-based sequence.

5. The method of claim 3 wherein the sequence comprises a formula-based sequence.

6. The method of claim 3 wherein the at least one identified grouping comprises at least two identified groupings and wherein the first carrier frequency comprises a member of first one of the at least two identified groupings and the second carrier frequency comprises a member of a second, different one of the at least two identified groupings.

7. A method comprising:
   at a wireless radio frequency receiver:
   in a learning mode of operation:
      scanning a plurality of carrier frequencies as are included in each of a plurality of different carrier frequency groupings to identify which one or more of the carrier frequency groupings contain a carrier frequency being used by a wireless radio frequency transmitter to thereby provide at least one identified grouping;
   in a normal mode of operation:
      using the at least one identified grouping, but not groupings that were not identified as an identified grouping during the learning mode of operation, to scan carrier frequencies as are included in individual ones of the at least one identified grouping to thereby receive a message transmitted by the wireless radio frequency transmitter;
   receiving the message through a first transmission activated in response to a first user assertion of the wireless radio frequency transmitter using a first carrier frequency that comprises one of the plurality of carrier frequencies;
   receiving the message through a second transmission activated in response to a second user assertion of the wireless radio frequency transmitter using a second carrier frequency that comprises one of the plurality of carrier frequencies that is different than the first carrier frequency.

* * * * *